US009935464B2

(12) United States Patent
Robbins

(10) Patent No.: US 9,935,464 B2
(45) Date of Patent: Apr. 3, 2018

(54) SMART JUNCTION BOX FOR PHOTOVOLTAIC SOLAR POWER MODULES WITH NOVEL POWER SUPPLY CIRCUITS AND RELATED METHOD OF OPERATION

(71) Applicant: Steven Andrew Robbins, Calabasas, CA (US)

(72) Inventor: Steven Andrew Robbins, Calabasas, CA (US)

(73) Assignee: Sunfield Semiconductor, Inc., Calabasas, CA (US)

( * ) Notice: Subject to any disclaimer, the term of this patent is extended or adjusted under 35 U.S.C. 154(b) by 19 days.

(21) Appl. No.: 14/956,831

(22) Filed: Dec. 2, 2015

(65) Prior Publication Data

US 2016/0172863 A1 Jun. 16, 2016

Related U.S. Application Data

(60) Provisional application No. 62/087,160, filed on Dec. 3, 2014.

(51) Int. Cl.
| | |
|---|---|
| *H02M 3/156* | (2006.01) |
| *H02M 1/32* | (2007.01) |
| *H02J 1/08* | (2006.01) |
| *H02J 1/10* | (2006.01) |
| *H02J 3/38* | (2006.01) |
| *H02S 40/34* | (2014.01) |
| *H02M 3/04* | (2006.01) |

(52) U.S. Cl.
CPC ............... *H02J 3/383* (2013.01); *H02J 1/10* (2013.01); *H02M 3/04* (2013.01); *H02S 40/34* (2014.12); *Y02E 10/563* (2013.01); *Y02P 80/11* (2015.11); *Y02P 80/23* (2015.11)

(58) Field of Classification Search
CPC .. H02J 1/08; H02J 3/383; H02J 1/108; H02M 1/32; H02M 3/156
See application file for complete search history.

(56) References Cited

U.S. PATENT DOCUMENTS

| | | | |
|---|---|---|---|
| 8,169,252 | B2 | 5/2012 | Fahrenbruch et al. |
| 8,618,864 | B2 | 12/2013 | Robbins |

(Continued)

*Primary Examiner* — Timothy J Dole
*Assistant Examiner* — Sisay G Tiku
(74) *Attorney, Agent, or Firm* — Lowry Blixseth LLP; Scott M. Lowry

(57) ABSTRACT

A smart junction box for a photovoltaic solar power module, and related method of operation. The junction box includes a plurality of active bypass circuits for protecting the solar cells from reverse bias, a novel power supply circuit in several embodiments that can operate with input voltages of either positive or negative polarity, a capacitor for storing and supplying energy, and a master control circuit. The master control circuit is able to enable/disable the power supply, force the bypass switches to open, and modulate the on-resistance of the bypass switches. The master control circuit performs these functions in a coordinated way to maintain the voltage across the capacitor within predetermined limits, thereby ensuring the internal circuitry is powered under all operating conditions including: full sunlight, partial shading, full shading, and safe mode for reducing the risk of electrical shock to firefighters.

25 Claims, 9 Drawing Sheets

(56) References Cited

U.S. PATENT DOCUMENTS

| | | | |
|---|---|---|---|
| 8,654,551 B2* | 2/2014 | Sase | H02M 7/217 |
| | | | 363/65 |
| 8,710,351 B2 | 4/2014 | Robbins | |
| 8,842,397 B2* | 9/2014 | Fahrenbruch | H01L 31/02021 |
| | | | 361/1 |
| 9,000,615 B2 | 4/2015 | Robbins | |
| 9,178,353 B2 | 10/2015 | Robbins | |
| 9,425,783 B2* | 8/2016 | Avrutsky | |
| 2006/0152085 A1* | 7/2006 | Flett | B60L 9/30 |
| | | | 307/75 |
| 2009/0014050 A1* | 1/2009 | Haaf | H01L 31/02021 |
| | | | 136/244 |
| 2012/0043818 A1* | 2/2012 | Stratakos | H02J 3/383 |
| | | | 307/77 |
| 2012/0055530 A1 | 3/2012 | Ger et al. | |
| 2013/0009483 A1* | 1/2013 | Kawate | H02J 3/383 |
| | | | 307/77 |
| 2013/0120953 A1 | 5/2013 | Lin | |
| 2013/0200710 A1* | 8/2013 | Robbins | H01L 31/02021 |
| | | | 307/77 |
| 2013/0201027 A1 | 8/2013 | Bucher | |
| 2013/0301314 A1* | 11/2013 | Fu | H02M 7/487 |
| | | | 363/37 |
| 2013/0333741 A1* | 12/2013 | Doutreloigne | H01L 31/02021 |
| | | | 136/244 |
| 2014/0168835 A1* | 6/2014 | Fornage | H02H 7/20 |
| | | | 361/57 |
| 2016/0164457 A1* | 6/2016 | Robbins | H02S 40/34 |
| | | | 307/80 |

\* cited by examiner

SMART JUNCTION BOX FOR PHOTOVOLTAIC SOLAR POWER MODULES WITH NOVEL POWER SUPPLY CIRCUITS AND RELATED METHOD OF OPERATION

BACKGROUND

The present invention relates generally to the field of solar power, and more specifically to power supply circuits used in smart junction boxes (j-boxes) for photovoltaic (PV) solar power modules and related methods of operation.

FIG. 1 is a simplified schematic diagram of a conventional solar power module 10 including: a positive terminal 11 and a negative terminal 12 for connecting the module 10 to a solar array; a plurality of serially connected PV segments 13, each of the segments include a plurality of serially connected PV cells for converting sunlight into electricity; and a conventional j-box 14 that houses bypass diodes 15 (typically Schottky diodes) connected in parallel with each PV segment 13.

For purposes of the present application, there is no official definition of a "smart" j-box, but in the context of this document, a smart j-box is one that contains any kind of active circuitry, rather than just conventional Schottky bypass diodes 15.

FIG. 2 is a simplified schematic diagram of a solar power module 20 with a first type of smart j-box 21. This is the simplest form of a smart j-box 21, wherein the conventional bypass diodes 15 are replaced with active bypass circuits 16. Each active bypass circuit 16 includes: a bypass diode 22; an electronically controlled switch 23; and a control circuit 24 for controlling the switch 23.

When the PV segments 13 are partially shaded, their short-circuit output current ($I_{SC}$) decreases. If $I_{SC}$ falls below the string current ($I_{STRING}$) the bypass diode 22 becomes forward biased. The anode voltage rises above the cathode voltage, causing the control circuit 24 to close the switch 23. When the shade is removed, the polarity of the anode-to-cathode voltage reverses, causing the control circuit 24 to open the switch 23 again.

The key advantage of active bypass is drastically reduced heat dissipation. For example, a typical Schottky bypass diode 15 will have a forward voltage drop of approximately 400 mV at 8 A current, producing 3.2 W of heat in the diode. In contrast, the switch 23 is typically a Metal-Oxide-Semiconductor Field-Effect Transistor (MOSFET) with an on-resistance of about 5 mΩ. Such a MOSFET, conducting the same 8 A current, dissipates just 0.32 W of heat, or 90% less. Reducing the heat dissipation can greatly increase the reliability of the j-box 21, and may even reduce it's cost by eliminating the need for a heat sink.

In a smart j-box such as 21, each bypass diode 22 is typically the body-diode that is an integral part of the associated MOSFET switch 23, rather than being discrete components, like the conventional bypass diodes 15 of FIG. 1.

A smart j-box such as 21 requires a means for powering the control circuits 24. Some prior art examples (e.g., U.S. Pat. Nos. 8,618,864 B2 and 4,869,254 B2) provide this means by making each control circuit 24 a special kind of dc-to-dc converter. When the bypass diode 22 is forward biased, the control circuit 24 converts the relatively small anode-to-cathode voltage into a much larger output voltage that is applied to the gate of the MOSFET switch 23. Once the switch 23 is closed, the anode-to-cathode voltage drops to typically 50 mV. But the special power supply has so much voltage gain (typically at least 100) that it can continue producing enough voltage (typically at least 5V) to keep the associated MOSFET switch 23 fully enhance (completely turned on).

The special power supply circuit in 24 typically produces just a few microamps of output current. While this is perfectly adequate for the task of turning on the MOSFET switch 23, it's simply not enough to do much else.

Yet there is a strong desire in the PV industry for smart j-boxes that can do more than just active bypass. For example, a smart j-box could perform many other useful functions, such as: module-level shutdown (safe mode) for firefighter safety; module-level performance monitoring for improving system efficiency by identifying particular solar modules that are under-performing; arc-fault detection to reduce the risk of fires; and diagnostics (e.g., self-test and arc fault location) to reduce system down-time and maintenance costs.

But these functions require a lot more supply current, typically at least a few milliamps. Providing this much current is not a simple problem because there are at least two basic technical challenges that must be overcome. The first basic challenge is providing power continuously. In the example above, each control circuit 24 only provided power when it's diode 22 was forward biased, and was unpowered the rest of the time. But a smart j-box with all the functions listed above needs power all the time. One reason why providing power continuously is challenging is that the polarity of the voltage between the positive terminal 11 and negative terminal 12 can actually flip; normally the positive terminal 11 is at a higher potential than the negative terminal 12, but when all the bypass diodes are forward biased concurrently the negative terminal 12 is actually at a higher potential than positive terminal 11. Power supply circuits normally require the polarity of their input voltage to be fixed and predetermined.

The second basic challenge is the ultra-wide range of input voltage. When there is no shade on the PV segments 13, the solar module 20 can typically produce up to 36 Vdc between positive terminal 11 and negative terminal 12. But when all the switches 23 are closed concurrently the voltage typically drops below 200 mV. That's a huge ratio of 180:1, and a power supply that can operate over such a wide input voltage range is extremely unusual. The vast majority of power supply circuits operate over an input voltage range of less than 3:1. Furthermore, it is also extremely unusual for a power supply circuit to operate at the ulna-low input voltage of 200 mV.

FIG. 3 is a simplified schematic of a power supply 30 representing a conventional approach that would be obvious to anyone of ordinary skill in the art of power supply design. A battery 31 represents a voltage source that can have either polarity, because it is attached to the circuit via some connector contacts 32a and 32b, which makes it possible to install the battery backwards. Therefore, a polarity correction circuit 33 is included to ensure the input voltage to the dc-to-dc converter 34 is always correct. Typically, the polarity correction 33 is just a plain old bridge rectifier consisting of four diodes, as shown. But in a smart j-box that must operate in safe mode (wherein the input voltage is only about 200 mV), the two diode drops (approximately 1.2V) associated with a bridge rectifier 33 would be unacceptable. So each diode in the bridge would have to be replaced with a MOSFET switch, making a so-called "active bridge".

This active bridge approach has some obvious disadvantages. First, it requires at least five large MOSFETs (four in the polarity correction 33 and one for the switch inside the converter 34). These would take up a lot of area on an integrated circuit, making it relatively large, and therefore expensive. Second, the challenge of operating at very low input voltage (safe mode) is made more difficult because of the combined on-resistance of these MOSFETs. And third, there would have to be some relatively complex control circuits for opening and closing the four switches in the active bridge.

Therefore, there is a need in the PV solar power industry for a way of powering a smart j-box for PV solar power module that provides power continuously, in all situations including safe mode, and enough power to enable all the advanced functions of a smart PV j-box.

SUMMARY

The invention comprises: a smart j-box for photovoltaic solar power modules with novel means of producing power to run the internal circuitry; the related method of operation; and a novel power supply circuit used therein. The novel means comprises: a plurality of active bypass circuits for protecting solar cells from reverse bias under partial shading conditions; the novel power supply circuit in several embodiments; a capacitor for storing and supplying energy; and a master control circuit in several embodiments for controlling the active bypass circuits and the power supply.

The power supply is operated in bursts to recharge the capacitor. In between bursts, the energy stored in the capacitor powers the circuitry. When the voltage across the capacitor falls below a first predetermined threshold, the master control circuit enables the power supply until the capacitor voltage rises to a second predetermined threshold. When the solar power module is fully shaded, the master control circuit can also force all the active bypass circuits to open their switches, thereby providing additional input voltage to the power supply.

The power supply is special because it can operate with an input voltage of either positive or negative polarity, and over an ultra-wide input voltage range. The input voltage can typically be as low as 200 mV, allowing the power supply to continue operating even when all the bypass switches are closed, thus providing a safe mode to reduce the shock hazard for firefighters. One embodiment of the power supply uses a combination of two dc-to-dc converters with very different construction and performance. Another embodiment of the power supply is a very novel topology that uses a single inductor.

The method comprises steps of: configuring a power supply circuit to receive energy from the positive and negative terminals and produce energy in response to being enabled; storing energy produced by the power supply circuit in a capacitor; producing a first control signal that is asserted in response to the voltage across the capacitor being relatively lower than a first predetermined threshold and unasserted in response to the voltage across the capacitor being relatively greater than a second predetermined threshold; producing a second control signal for opening the electronically controlled bypass switches; enabling the power supply while the first control signal is asserted; and utilizing energy stored in the capacitor to power the circuitry inside the smart junction box while the power supply circuit is disabled. In solar modules that have safe mode the method further comprises: increasing the resistance of the bypass switches in response to a reduction in the capacitor voltage; and decreasing the bypass switch resistance in response to an increase in the capacitor voltage.

BRIEF DESCRIPTION OF DRAWINGS

The accompanying drawings illustrate the invention. In such drawings.

DETAILED DESCRIPTION

Figure 1:
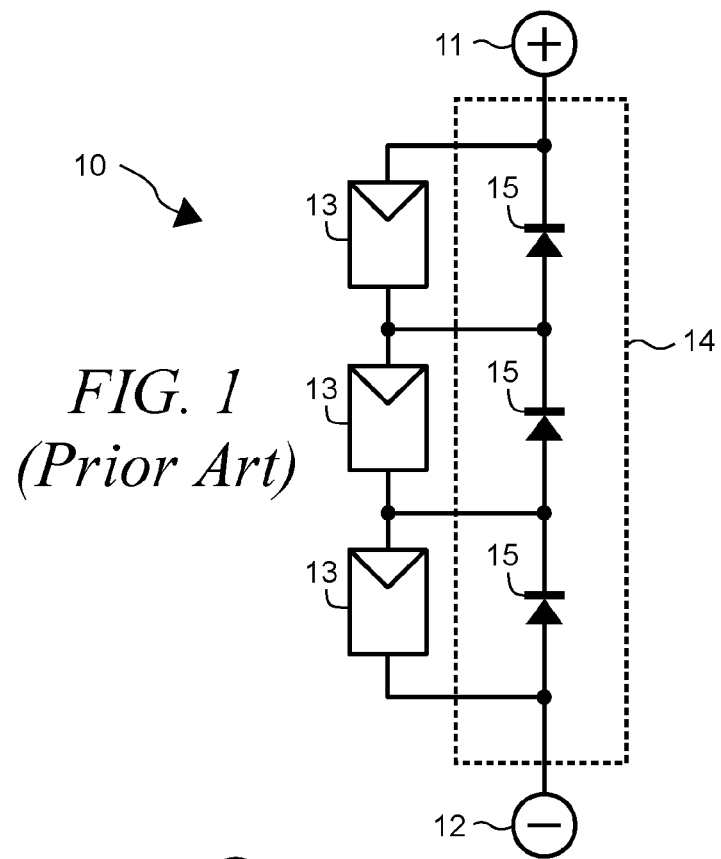
FIG. 1 is a simplified schematic diagram of a conventional PV solar power module known in the prior art.
Figure 2:
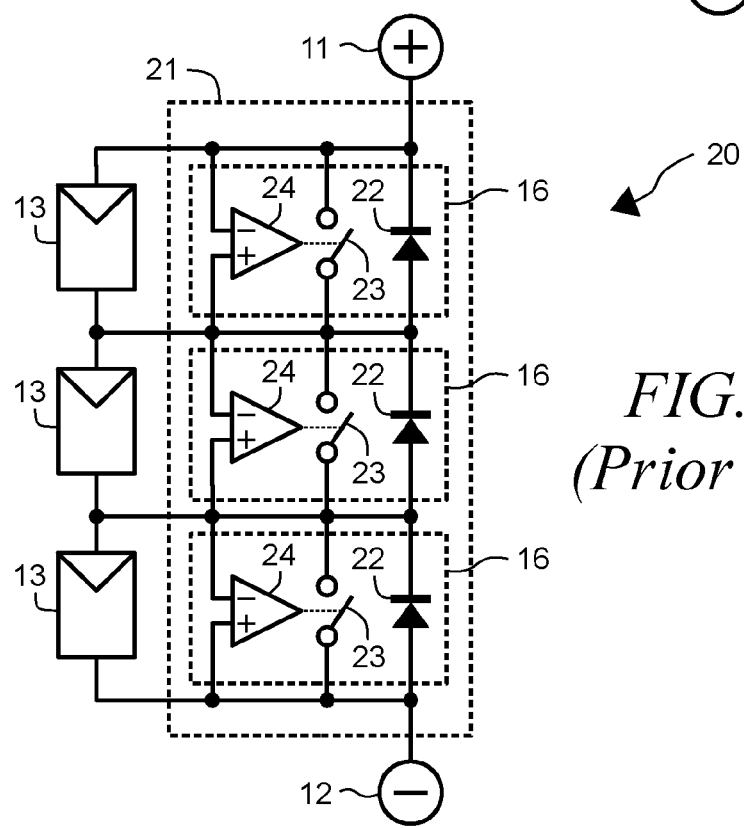
FIG. 2 is a simplified schematic diagram of a prior art solar power module with a smart solar j-box.
Figure 3:
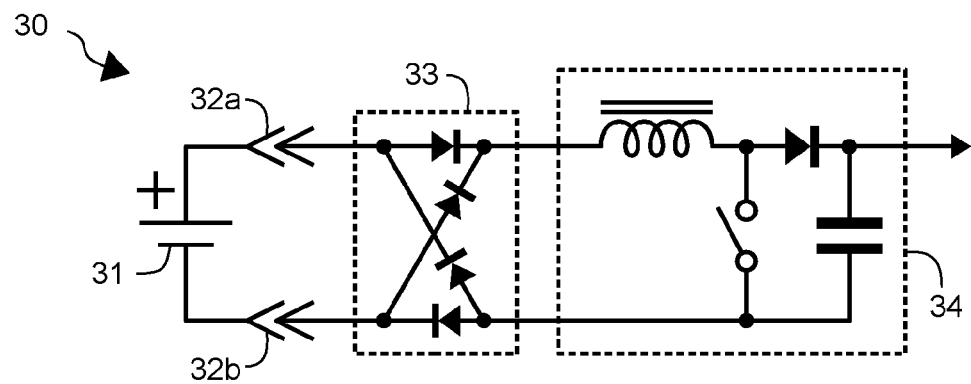
FIG. 3 is a simplified schematic diagram of a conventional power supply design.
Figure 4:
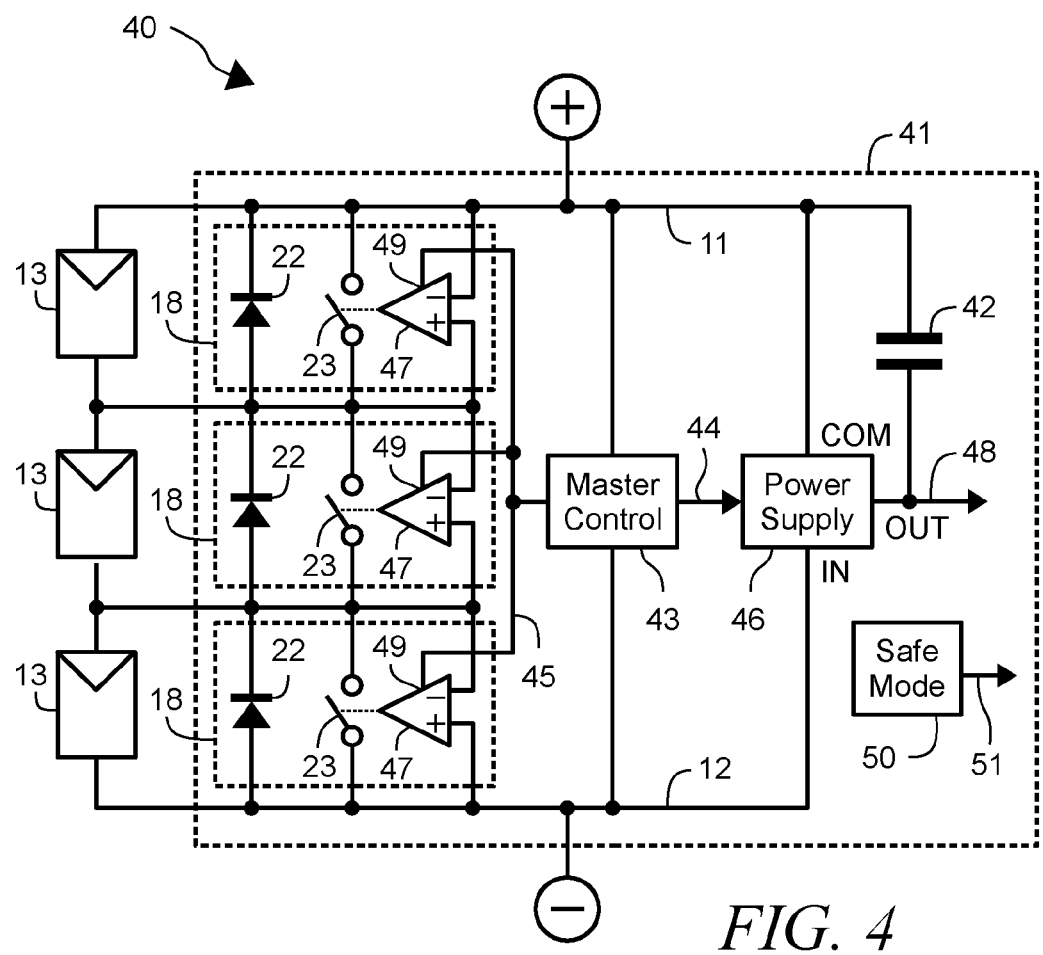
FIG. 4 is a high level diagram of a solar power module including the smart j-box disclosed herein.

As shown in the drawings for purposes of illustration, the present invention for a smart junction box for photovoltaic solar power modules, power supply circuits used therein, and related method of operation, is shown with respect to several embodiments in FIGS. 4-16. More specifically, FIG. 4 is a high level diagram of a solar power module 40 that includes a smart solar j-box 41 comprising: a positive terminal 11 and negative terminal 12 for connecting the solar power module 40 to a solar array; a capacitor 42 for storing and supplying energy; a master control circuit 43 for producing at least a first control signal 44 and a second control signal 45; a plurality of special bypass circuits 18 serially connected between the positive terminal 11 and negative terminal 12 for protecting the PV segments 13 from reverse bias; and a power supply circuit 46 receiving power from the positive 11 and negative 12 terminals and providing power to recharge the capacitor 42 in response to the first control signal 44 being asserted. Each special bypass circuit 18 comprises: a bypass diode 22; an electronically controlled switch 23 connected in parallel with the bypass diode 22; and a control circuit 47 for opening and closing the switch 23. Each bypass control circuit 47 has an override input 49 for receiving the second control signals 45.

Typically the smart solar j-box 41 also includes a circuit 50 for producing a third control signal 51 representing the safe mode when asserted. But the power supply circuits of the invention could also be used in a smart j-box that doesn't have a safe mode. So some embodiments of the invention have the safe mode, while other embodiments don't.

Before explaining how all these elements work together as a system, some high level aspects of the power supply circuit 46 must first be disclosed. First, the positive terminal 11 is considered to be "common" (ground) and all voltages, unless otherwise noted, are referenced to this node. Second, the negative terminal 12 is both the input voltage to the power supply 46, and the output voltage of the solar module 40. And third, the output 48 of the power supply 46 is also the voltage on the capacitor 42, so this is referred to in some places as the "cap voltage" instead of the "output voltage" to avoid confusion with the output voltage 12 of the module 40.

Figure 5:
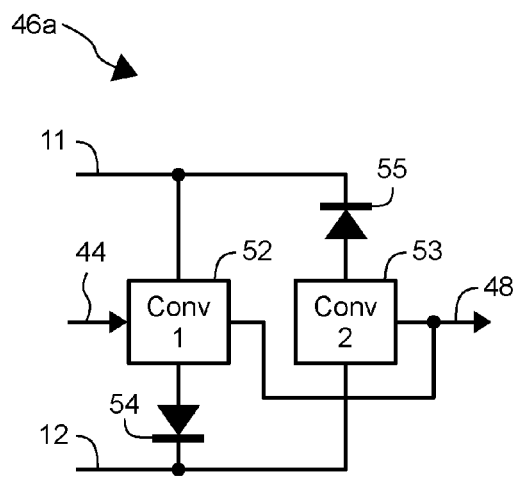
FIG. 5 is a simplified schematic diagram of a first embodiment of the power supply circuit disclosed herein.

FIG. 5 is a simplified schematic diagram of a first embodiment 46a of the power supply 46 comprising a first dc-to-dc converter 52; a second dc-to-dc converter 53; and two blocking diodes 54 and 55. Using two converters solves the previously stated problem of operating with either positive or negative input voltage polarity. When the input voltage is negative (12 is at a lower potential than 11) the first converter 52 receives power via the first blocking diode 54 and produces the output 48, while the second converter 53 is protected by the second blocking diode 55. Conversely, when the input voltage is positive, the second converter 53 receives power via the second blocking diode 55 and produces the output 48, while the first converter 52 is protected by the first blocking diode 54. The blocking diodes are needed because each converter typically uses a MOSFET as it's internal switch, and a MOSFET can block current only in one direction because of it's integral body diode.

Using two converters instead of one has the additional advantage that they can have very different characteristics. So one converter can satisfy some of the design requirements, while the other converter satisfies the rest of the requirements.

The first converter 52 must operate over a very wide input voltage range; typically −36 Vdc in full sunlight, down to about −0.2 Vdc in safe mode. The first converter 52 must also "bootstrap", meaning that (after startup) it's internal circuits are powered from the output 48 because in safe mode the input voltage is far too low. But bootstrapping also means the first converter 52 can continue to run (or at least continue to draw power from the output 48) even after the first blocking diode 54 is reverse biased. This problem is solved by the first control signal 44. When this signal 44 is asserted, the first converter 52 is enabled to run, but while the signal 44 is unasserted the first converter 52 is disabled.

The second converter 53 provides power to the output 48 only while the solar power module 40 is fully shaded, because that is the only time the input voltage is positive (negative terminal 12 is at a higher potential than the positive terminal 11). A key design requirement for the second converter 53 is that it must always start up with just +1.2 Vdc. This will be explained more fully below, in regard to FIG. 14.

Notably, the first converter 52 is an "inverting" converter, meaning that it's input voltage and output voltage have opposite polarities. So the first converter 52 is typically constructed with a classic inverting topology known as "buck-boost". But the second converter 53 is non-inverting since it's output voltage is the same polarity as it's input voltage, only much bigger. So the second converter 53 is typically constructed with another classic topology known as "boost".

Figure 6:
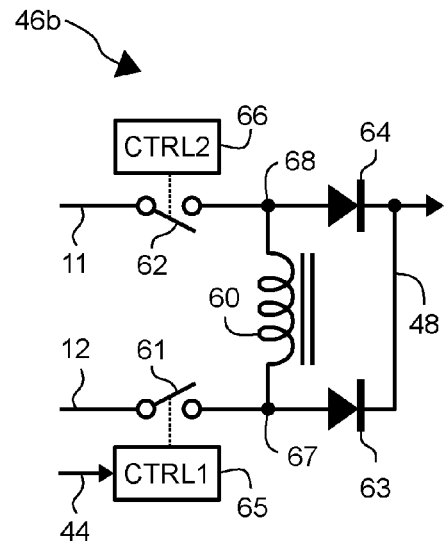
FIG. 6 is a simplified schematic diagram of a second embodiment of the power supply circuit.

FIG. 6 is a simplified schematic diagram of a second embodiment 46b of the power supply circuit 46 comprising: an inductor 60; a first switch 61 disposed between the negative terminal 12 and the first end 67 of the inductor 60; a second switch 62 disposed between the positive terminal 11 and the second end 68 of the inductor 60; a first diode 63 disposed between the first end 67 of the inductor 60 and the output 48; a second diode 64 disposed between the second end 68 of the inductor 60 and the output 48; a first control circuit 65 for controlling the first switch 61; and a second control circuit 66 for controlling the second switch 62.

Figure 7A:
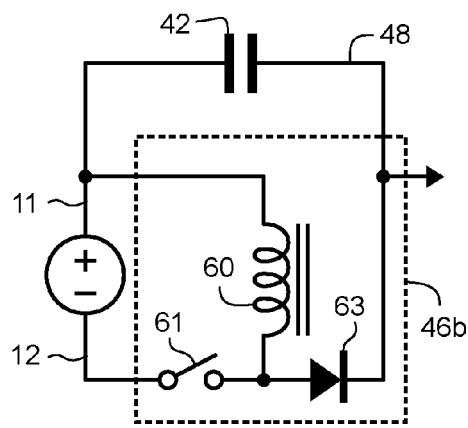
FIG. 7A is a simplified schematic diagram of the second embodiment of the power supply circuit operating in a first mode.
Figure 7B:
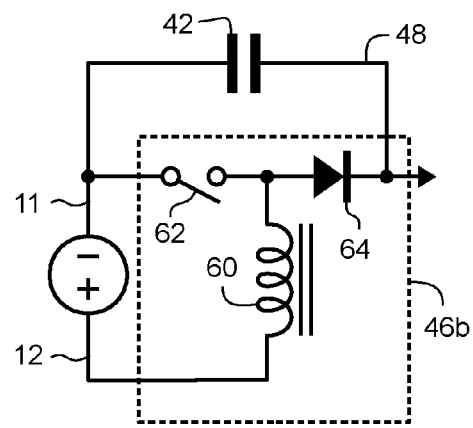
FIG. 7B is a simplified schematic diagram of the second embodiment of the power supply circuit operating in a second mode.

This second embodiment 46b is a new power supply topology that has the extremely novel property of being able to operate with input voltage of either polarity. No previously known power supply topology has this property. FIG. 7A is a simplified schematic of 46b in a first mode, wherein: the second switch 62 is always closed, and is therefore replaced with just a wire; and the second diode 64 is always reverse biased, and is therefore omitted. What remains in FIG. 7A operates similarly to a classic buck-boost converter. Similarly, FIG. 7B is a simplified schematic of the of 46b in a second mode, wherein: the first switch 61 is always closed, and is therefore replaced with just a wire; and the first diode 63 is always reverse biased, and is therefore omitted. What remains in FIG. 7B operates similarly to a classic boost converter.

The capacitor 42 is shown in FIGS. 7A-7B, basically for reference. Among those with ordinary skill in the art of switching power supply design, it is universally understood that the load is connected in parallel with the output filter cap, so showing the cap indicates which terminal (11 in this case) is "common".

Figure 8:
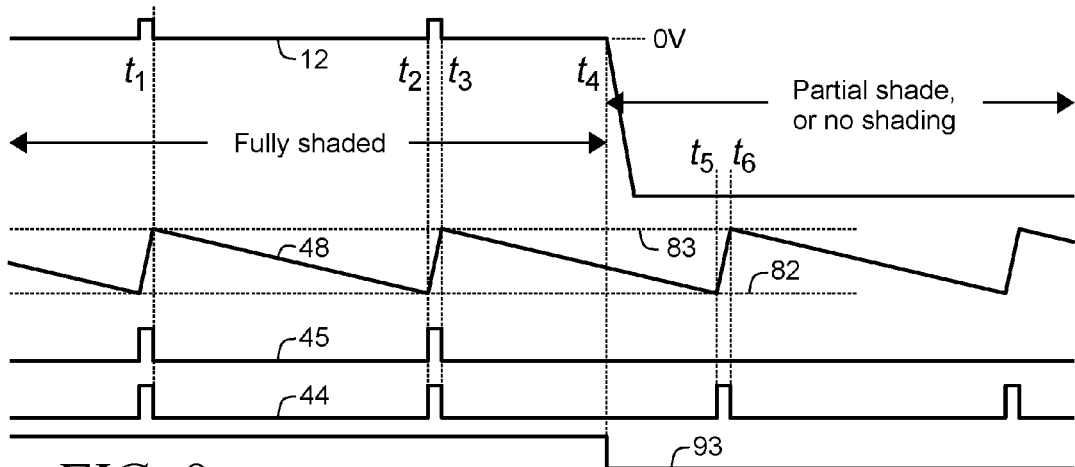
FIG. 8 is a high level timing diagram related to a first embodiment of the master control circuit.
Figure 9:
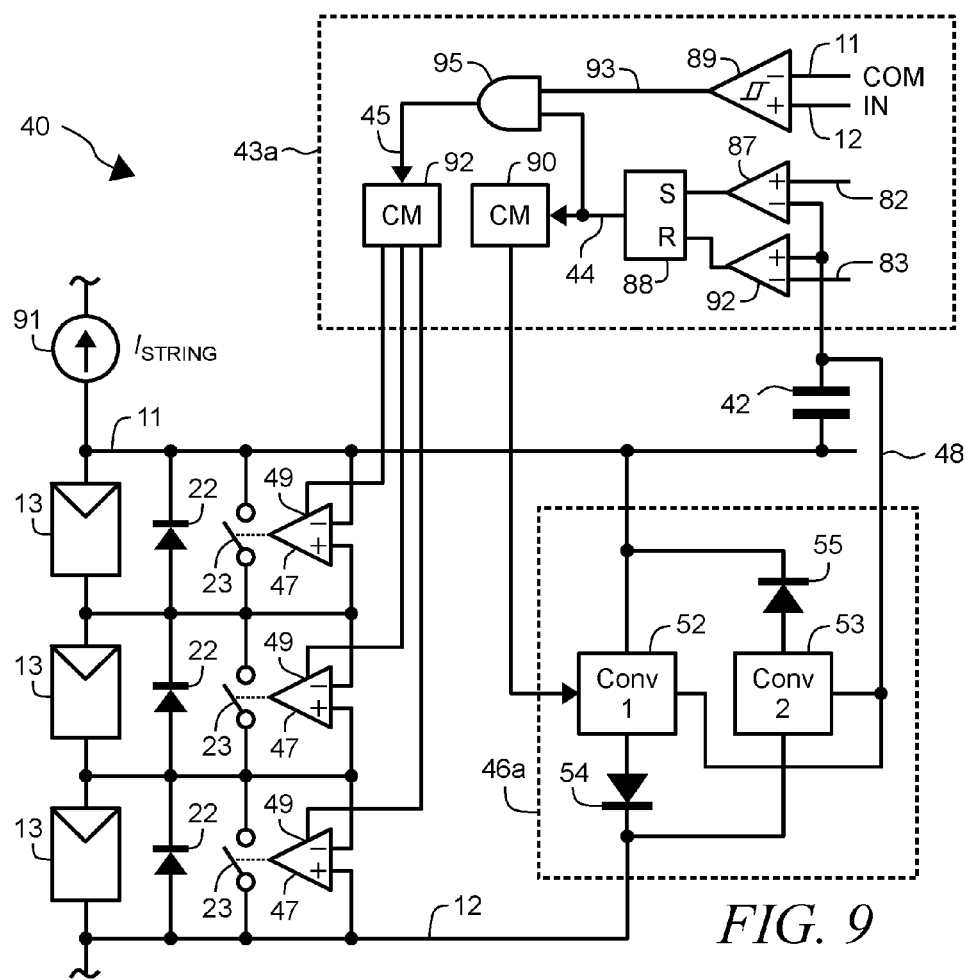
FIG. 9 is a simplified schematic diagram of a solar power module utilizing the first embodiment of the power supply, and the first embodiment of the master control circuit.

FIGS. 8-9 are related to each other. FIG. 9 is a simplified schematic of the solar module 40 using the first embodiment 46a of the power supply 46, and a first embodiment 43a of the master control circuit 43. And FIG. 8 is a related high level timing diagram showing example waveforms.

The top waveform 12 is the input voltage to the power supply 46a. The second waveform 48 is the voltage across the capacitor 42. The third waveform is the second control signal 45. And the bottom waveform is the first control signal 44.

Figure 11:
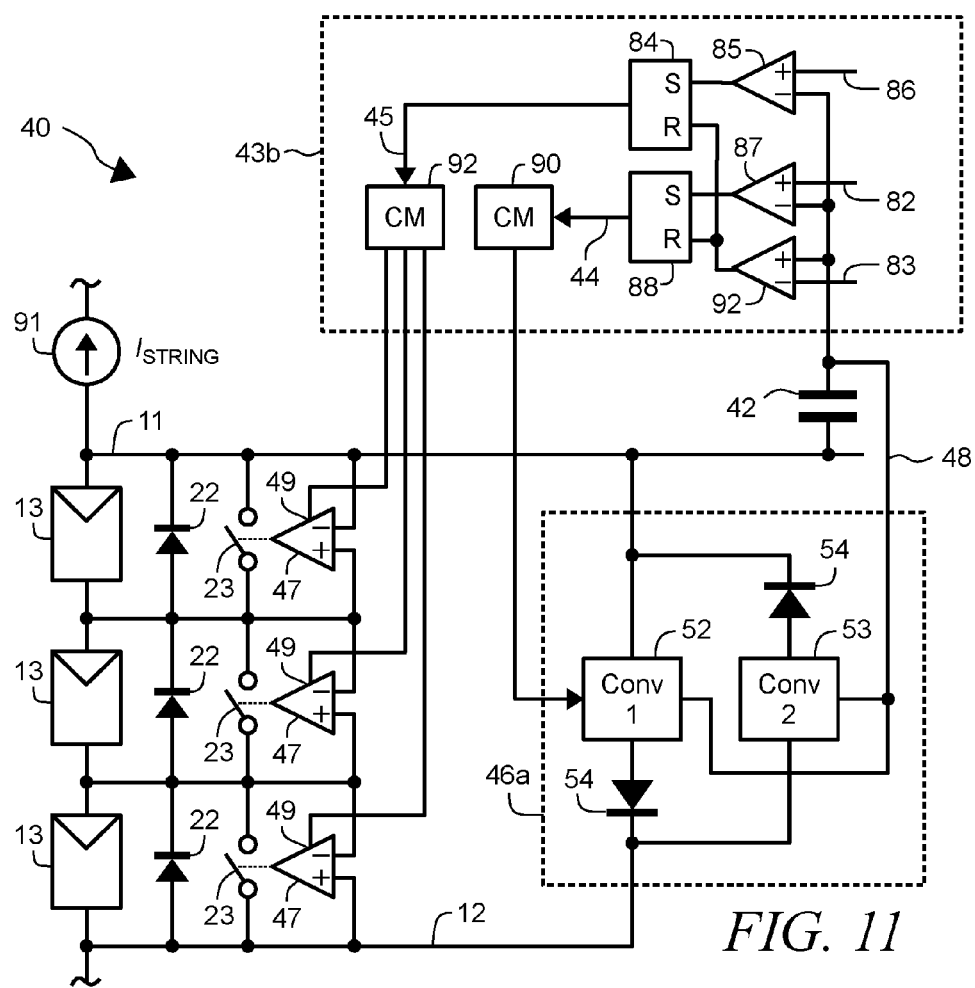
FIG. 11 is a simplified schematic diagram of a solar power module utilizing the first embodiment of the power supply, and the second embodiment of the master control circuit.

It should be noted that the current source 91 represents the $I_{STRING}$, and is not actually a part of the solar module 40. For example, in a typical solar array the solar module 40 is part of a string of similar solar modules connected in series, and the string is connected to an inverter that typically includes a Maximum Power Point Tracker (MPPT) circuit. The MPPT regulates the string current to keep all the modules operating near their maximum power point. Thus the string current 91 is shown in FIGS. 9 and 11 just for the purpose of explaining how the module 40 behaves in such a solar power system, and should not be interpreted as being a part of the solar module 40.

The first control signal 44 is typically the output of a flip-flop 88, and 44 is asserted when the cap voltage 48 falls below a first predetermined threshold 82 (typically 12V) because a first comparator 87 sets the flip-flop 88. The first control signal 44 is unasserted when the cap voltage 48 exceeds a second predetermined threshold 83 (typically 20V) because a second comparator 92 resets the flip-flop 88. A first current mirror 90 conveys the first control signal 44 to the power supply 46a.

In the first embodiment 43a of the master control circuit, a fourth control signal 93 is produced by a third comparator 89 that has hysteresis. Hysteresis means that the comparator 89 essentially has two thresholds; one for settings it's output 93 high, and the other for setting it's output low. Therefore, the fourth control signal 93 is asserted (set high) in response to the input voltage 12 rising above a third predetermined threshold (typically zero ±0.5 mV) and unasserted (set low) in response to the input voltage 12 falling below a fourth predetermined threshold (typically −5 mV). The second control signal 45 is produced by the AND gate 95 and is therefore asserted while the first 44 and third 93 control signals are asserted concurrently. And a second current mirror 92 conveys the second control signal 45 to the override 49 input of each bypass control circuit 47.

Before $t_4$ the solar module 40 is fully shaded, so/sc for each PV segment 13 is less than $I_{STRING}$. This produces a net forward current through each bypass diode 22, causing the control circuits 47 to close all the switches 23. But the switches 23 have a non-zero on-resistance, so the current flowing through the switches makes the input voltage 12 slightly positive (typically at least 2 mV). This is above the third predetermined threshold, so the fourth control signal 93 is high.

At time $t_1$ the first converter 52 is shut down because the first control signal 44 goes low, and the second converter 53 is also shut down because the input voltage 12 is too low for it to operate. So at $t_1$ everything runs off of the energy stored in the capacitor 42. And as the capacitor discharges, the cap voltage 48 ramps down (interval from $t_1$ to $t_2$).

At time $t_2$ the cap voltage 48 reaches the first predetermined threshold 82, and the first control signal 44 goes high. Since the fourth control signal 93 is already high, the second control signal 45 goes high too, and is conveyed through the second current mirror 92 to the override input 49 of each bypass controller 47, forcing all the switches 23 to open. Consequently, all the current that was flowing in the switches 23 now flows through the bypass diodes 22. Since there are typically three bypass diodes 22, the input voltage 12 goes positive by three diode-drops, typically 1.8V. This is enough voltage for the second converter 53 to start up and recharge the cap, so the cap voltage 48 ramps up quickly until $t_3$ when it reaches the second threshold 83. Then the first control signal 44 goes low, and the cycle repeats.

This repeating cycle of enabling and disabling the power supply 42a is known to those with ordinary skill in the art of power supply design as "burst mode", or operating the power supply in bursts. During each burst (when the first control signal 44 is high) the enabled converter performs typically hundreds of switching cycles, wherein each switching cycle opens and closes the switch inside the converter.

At time $t_4$ at least some of the shade is removed, restoring full sunlight to at least one of the PV segments 13, so at least one switch 23 opens. All of $I_{STRING}$ flows through the unshaded PV segment 13 and the associated bypass diode 22 becomes reverse biased. The input voltage 12 typically goes down to anywhere from about −10V to −30V, depending on how many of the switches 23 are open, and how much sunlight there is. This voltage 12 is well below the fourth predetermined threshold, so the fourth control signal 93 goes low.

At time $t_5$ the cap voltage 48 equals the first predetermined threshold 82, so the first control signal 44 goes high again, but this time the second control signal 45 stays low because 93 is low. Thus, the first converter 52 is enabled, and the cap voltage 48 ramps up quickly (interval from $t_5$ to $t_6$).

At time $t_6$ the cap voltage 48 reaches the second predetermined threshold 83, so the first control signal 44 goes low again, and the cycle repeats.

Notably, the power supply 46a always provides energy to recharge the cap 42 in response to the first control signal 44 being asserted. While the solar module 40 is not fully shaded (after $t_4$) the first control signal directly enables the first converter 52. But while the solar module is fully shaded (before $t_4$) the first control signal indirectly enables the second converter 53 by: asserting the first control signal 44, which also asserts the second control signal 45 since 93 is high, thereby causing the bypass control circuits 47 to open the switches 23 in response to the second control signal 45; as a result of the bypass switches 23 opening the input voltage 12 goes positive by typically three diode-drops; and as a result of the input voltage 12 going positive, the second converter 53 starts up and produces energy to recharge the cap 42. The second embodiment 46b of the power supply is enabled the same way as 46a.

One key aspect of the invention is that heat dissipation is minimized while the module 40 is fully shaded. When the bypass switches 23 are open, each bypass diode 22 can dissipate significant heat. For example, if the net current ($I_{STRING}$ minus $I_{SC}$ for each PV segment 13) is 8 A, and the forward voltage drop across each bypass diode 22 is 0.6V, then each bypass diode dissipates a peak power of 4.8 W. But the second converter 53 outputs current that is typically at least nineteen times greater than the total quiescent current of master control circuit 43b and the bypass control circuits 47, so the capacitor 42 recharges at least nineteen times faster than it discharges, thus the bypass switches 23 are open less than 5% of the time. The other 95% of the time, the switches 23 are closed, and their power dissipation (assuming 5 mΩ on-resistance) in each switch is 0.32 W. Thus, the average power in each bypass circuit is only 0.54 W.

Figure 10:
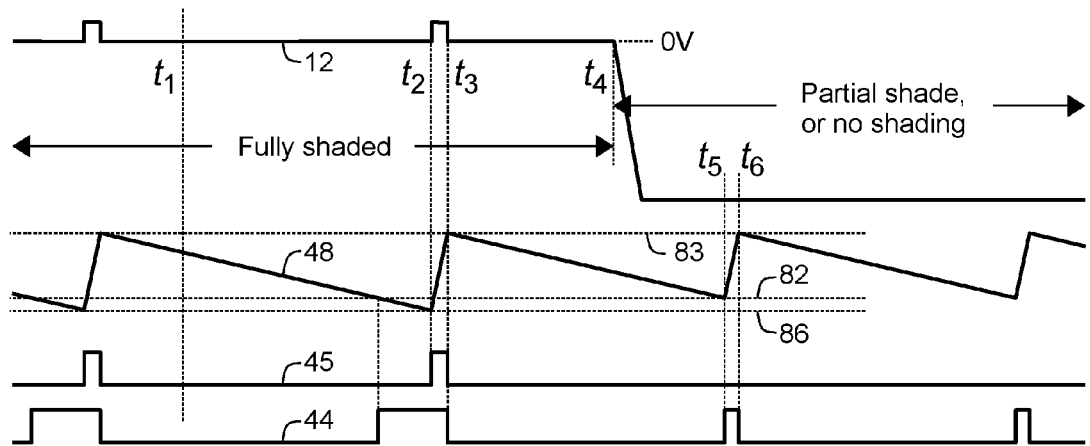
FIG. 10 is a high level timing diagram related to a second embodiment of the master control circuit.

FIGS. 10-11 are similar to FIGS. 8-9, except the solar module 40 uses a second embodiment 43b of the master control circuit. The AND gate 95, fourth control signal 93, and third comparator 89 are omitted from 43b. A second flip-flop 84 and fourth comparator 85 are added. Also, there is a fifth predetermined threshold 86, typically about 1V lower than the first threshold 82. The first control signal 44 is produced in the same manor as before: it is set when the cap voltage 48 drops to the first threshold 82, and cleared when the cap voltage 48 rises to the second threshold 83. But the second control signal 45 is asserted in response to the voltage across the capacitor 42 being lesser than the fifth predetermined threshold 86 that is relatively lower than the first predetermined threshold 82, and unasserted in response to the voltage across the capacitor 42 being greater than the second predetermined threshold 83.

The right side of FIG. 10 (after $t_4$) is the same as FIG. 8, so the circuit in FIG. 11 operates the same as FIG. 9 when at least one of the PV segments 13 is not shaded. But during fully-shaded operation (before $t_4$) the pulses in the first control signal 44 are significantly wider. This means the first converter 52 is enabled over a wider period.

Operation in safe mode is similar to normal operation (after $t_4$) only the first converter 52 produces less output current because the input voltage 12 is so low. Less current means it takes longer to recharge the cap 42, so the power supply bursts are longer, but the cycles continue, at least while the PV cells are fully insolated. However, the PV cells could be shaded while in safe mode, and as the light on the PV cells decreases, the input voltage to the second converter 52 decreases, and the bursts get longer. At some point the light intensity is so low that the bursts become continuous. And at some critical threshold, there is simply too little light on the PV cells, and the second converter 52 shuts down. It is desirable to minimize this critical shut-down threshold. The invention achieves this goal with a novel feedback loop that essentially regulates the input voltage 12 by varying the $R_{DS(ON)}$ of the MOSFETs.

Figure 12:
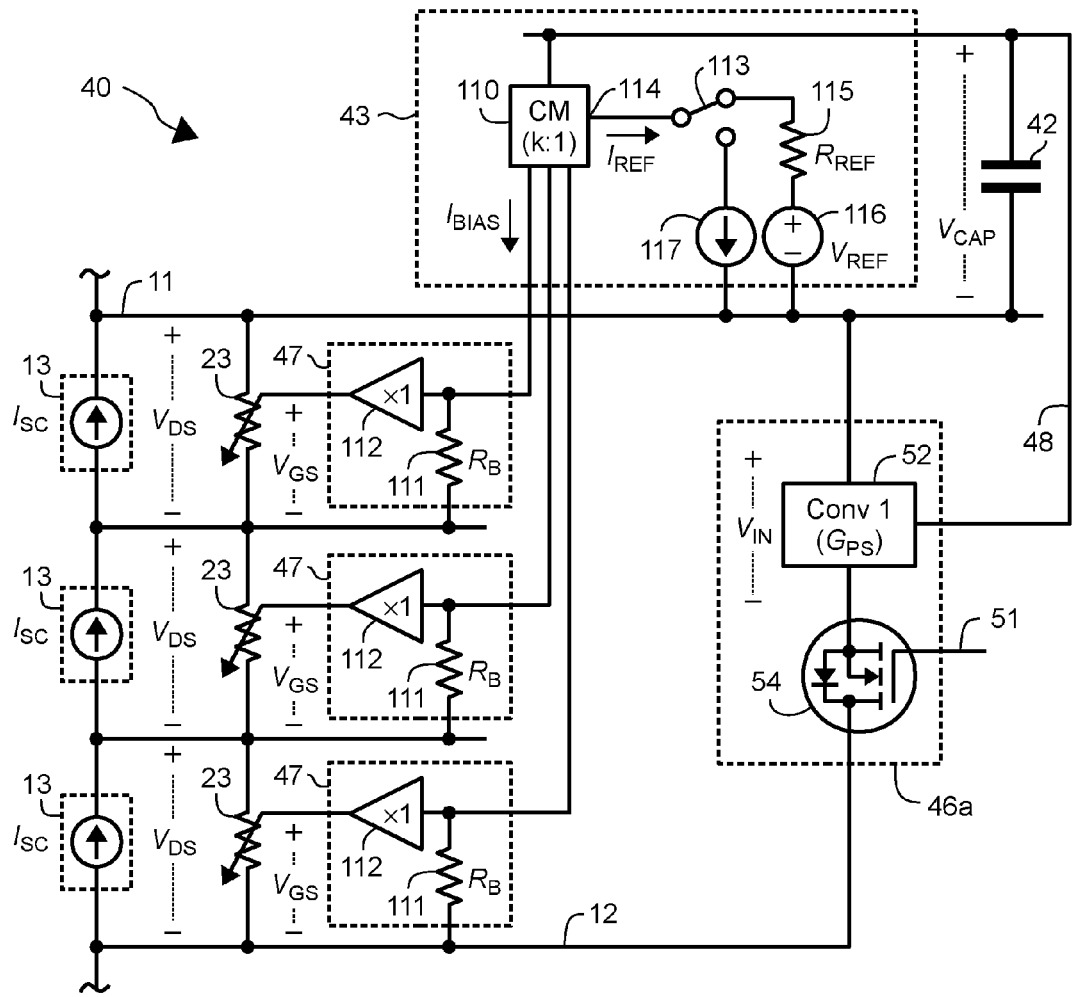
FIG. 12 is a simplified schematic diagram of a solar power module operating in safe mode.

FIG. 12 is a simplified schematic of the solar module 40 operating in safe mode to illustrate how this feedback loop works. As noted previously, the switches 23 are typically MOSFETs, and in safe mode all the MOSFETs are turned on. The drain-to-source voltage ($V_{DS}$) for each MOSFET is very low, typically around 65 mV, so the MOSFETs are operating in the linear region (also known as the triode region) of the characteristic curves. The drain-to-source on-resistance ($R_{DS(ON)}$) is a function of the gate-to-source voltage ($V_{GS}$) produced by the control circuit 47. To help make this concept clearer, the MOSFETs 23 are depicted in FIG. 12 as voltage-controlled resistors. Furthermore, since the switches 23 are all closed, the PV segments 13 are short-circuited, and represented in FIG. 12 as current sources at the $I_{SC}$ level. Thus we have two equations;

$$V_{DS}=I_{SC}R_{DS(ON)} \quad \text{Equation 1:}$$

and $$R_{DS(ON)}=f(V_{GS}). \quad \text{Equation 2:}$$

The input voltage ($V_{IN}$) for the first converter 52 is the sum of $V_{DS}$ for the plurality of N bypass circuits, minus the voltage drop across the first blocking diode 54. Typically N=3, so three times 65 mV yields 195 mV. But the voltage drop across a diode is typically about 600 mV, which is obviously too much. So the first blocking diode 54 must be a MOSFET, as is shown in FIG. 12. In safe mode, the third control signal 51 turns on the MOSFET, thereby reducing the voltage drop across the first blocking diode 54 to around 10 mV. Thus $V_{IN}$ is about 185 mV, which is enough to allow the first converter 54 to operate. Furthermore, the power supply can be thought of as an amplifier with a voltage gain of $G_{PS}$. Therefore, neglecting the voltage drop across 54, we have two more equations;

$$V_{IN}=NV_{DS} \quad \text{Equation 3:}$$

and $$V_{CAP}=G_{PS}V_{IN}. \quad \text{Equation 4:}$$

FIG. 12 also shows how each bypass control circuit 47 is provided with a local supply voltage. Each bypass control circuit 47 has it's own local "ground" and supply rail. A third current mirror 110 produces a bias current ($I_{BIAS}$) for each bypass control circuit 47. The current mirror has a ratio of k:1 meaning that $I_{BIAS}$ is k times the reference current ($I_{REF}$). Inside each bypass control circuit 47, $I_{BIAS}$ passes through a resistor 111 ($R_B$) making a local reference voltage, which is then buffered by a voltage follower 112 to make the local supply voltage. Notably, $V_{GS}$ is essentially equal to this local supply voltage when the switch 23 is turned on. So we have two more equations;

$$V_{GS}=R_BI_{BIAS} \quad \text{Equation 5:}$$

and $$I_{BIAS}=kI_{REF}. \quad \text{Equation 6:}$$

A selector switch 113 is typically used to enable or disable the feedback loop. Feedback is disabled when the selector switch 113 is in the lower position, connecting the current mirror's control terminal 114 to a fixed current reference 117, thereby keeping $V_{GS}$ constant as the cap voltage 48 ramps up and down. Feedback is enabled when the selector switch 113 is in the upper position, connecting the current mirror control terminal 114 to a reference resistor ($R_{REF}$) 115 and a reference voltage 116 ($V_{REF}$). To keep the math simple, we can assume the voltage at the control terminal 114 is that same as the cap voltage 48. So the voltage across $R_{REF}$ is the difference between $V_{CAP}$ and $V_{REF}$. Therefore;

$$I_{REF}=(V_{CAP}-V_{REF})/R_{REF}. \quad \text{Equation 7:}$$

Figure 13:
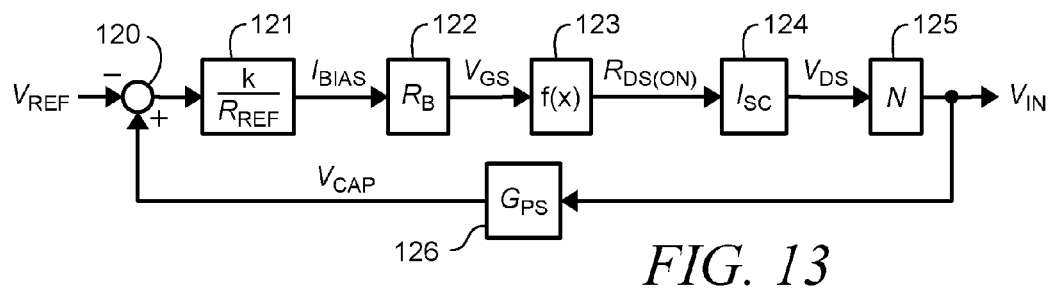
FIG. 13 is a simplified control diagram related to the feedback mechanism in FIG. 12.

FIG. 13 is a simplified control diagram to show that $V_{IN}$ is regulated by negative feedback. Those with ordinary knowledge in the field of classical control theory will understand that FIG. 13 is a simplification because all the poles and zeros are neglected; the objective is simply to show how the feedback mechanism works in steady-state (dc). But obviously, the control loop will have a single dominant pole because of the large capacitor 42 (typically 1 µF) and therefore it will be stable with a phase margin of approximately 90°.

FIG. 13 combines all seven equations listed above: the summing node 120 and first gain block 121 represent the combination of equations 6 and 7; the second gain block 122 represents equation 5; the third gain block 123 represents equation 2; the fourth gain block 124 represents equation 1; the fifth gain block 125 represents equation 3; and the feedback block 126 represents equation 4.

At first it may appear that the control loop is unstable because the output of 126 goes to a positive input of the summing node 120, thereby making positive feedback. However, the third gain block 123 has a negative sign, thereby making the feedback negative. The reason for the negative sign is that $R_{DS(ON)}$ is approximately inversely related to $V_{GS}$. As $V_{GS}$ increases, $R_{DS(ON)}$ decreases, and vise versa. So a graph of $V_{GS}$ vs. $R_{DS(ON)}$ would have a negative slope.

FIG. 13 shows that: a decrease in $V_{CAP}$ produces a decrease in $I_{BIAS}$ and $V_{GS}$; and the decrease in $V_{GS}$ produces a increase in $R_{DS(ON)}$ because of their approximately inverse relationship. Conversely, it can be easily seen that by a similar process an increase in $V_{CAP}$ produces a decrease in $R_{DS(ON)}$. Thus the elements 110-116 constitute a means for: increasing the on-resistance of the electronically controlled switches 23 in response to a reduction of the voltage across the capacitor 48; and decreasing the on-resistance of the electronically controlled switches 23 in response to an increase of the voltage across the capacitor 48. Therefore, we have negative feedback that maintains the input voltage 12 to the power supply 46 at a fairly constant level in safe mode as the shading conditions vary, thereby achieving the objective of maintaining operation down to the lowest light level.

Figure 14:
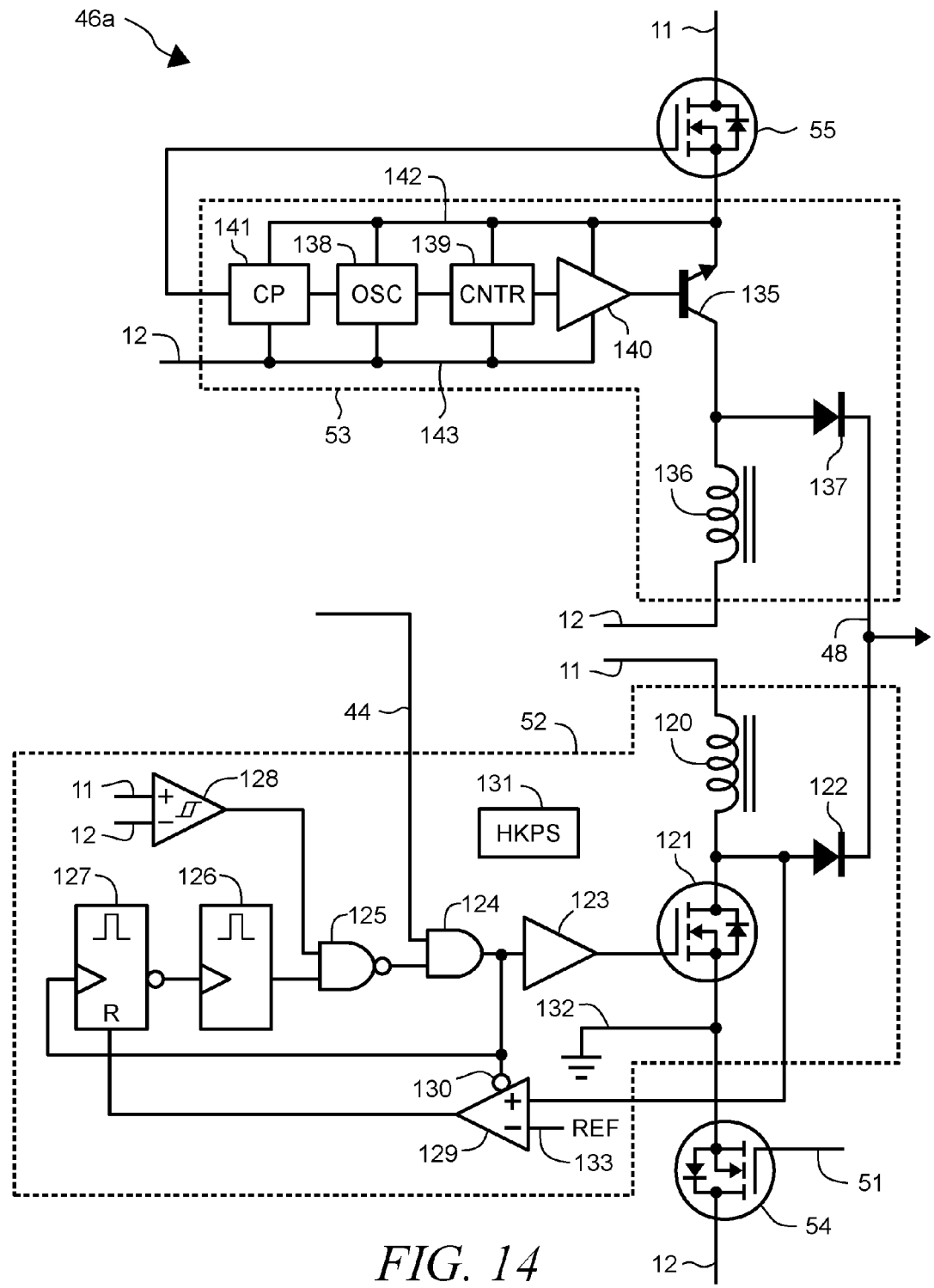
FIG. 14 is a simplified schematic diagram disclosing more details of the first embodiment of the power supply circuit.

FIG. 14 is a simplified schematic diagram disclosing more details of the first embodiment 46a of the power supply. As noted previously, the first converter 52 and second converter 53 are very different in their construction and performance.

The first converter 52 must operate over a very wide input voltage range without saturating the inductor 120. The solution in FIG. 14 satisfies this requirement by combining four techniques: burst mode (as was explained above in regard to FIG. 8); frequency modulation; Current Mode Control (CMC); and bootstrapping.

The first converter 52 includes a modulator section, a control section, and a housekeeping power supply (HKPS) 131 for supplying power to the control section. The modulator section comprises: a first inductor 120; a MOSFET switch 121; and a diode 122. The control section comprises: a gate driver 123; two logic gates 124 and 125; two monostable multivibrators 126 and 127 (commonly known as "one-shots"); a comparator 128 with hysteresis for sensing the polarity of the input voltage; and a current sense amplifier 129 with a null input 130. Node 132 is the "ground" for the control section and the HKPS.

Each switching cycle consists of an on-time ($t_{ON}$) wherein the MOSFET switch 121 is turned on, and an off-time ($t_{OFF}$) wherein the MOSFET switch 121 is turned off. The frequency modulation technique keeps $t_{OFF}$ constant, while varying $t_{ON}$.

The first one-shot 127 controls $t_{ON}$ and the CMC. During $t_{ON}$ the inductor 120 current ($I_L$) ramps up, and the on-resistance of the MOSFET 121 is used to sense $I_L$. When $I_L$ exceeds a predetermined threshold, typically around 30 mA, the drain-to-source voltage across the switch 121 exceeds a reference voltage 133, and the output of the current sense amplifier 129 goes high, thereby resetting the first one-shot 127 and ending $t_{ON}$. So $t_{ON}$ ends when $I_L$ exceeds the predetermined limit, or at the end of the time limit (typically 2 μs) imposed by the first one-shot 127, whichever comes first.

The second one-shot 126 controls the $t_{OFF}$. During $t_{OFF}$, $I_L$ ramps down as it flows through the diode 122 to the output 48. The fixed $t_{OFF}$ width is typically 100 ns.

Auto-nulling is typically used to improve the accuracy of the CMC current threshold. The reference voltage 133 is relatively small; typically just 20 mV. So the input offset voltage in the current sense amplifier 129 must be much smaller than this offset, otherwise the current limit level will be too inaccurate. A well known method for achieving such low input offset voltage is auto-nulling. When the null input 130 is low during $t_{OFF}$ the offset voltage is sensed and stored, typically as a voltage on a small capacitor inside the current sense amplifier 129. During $t_{ON}$ the null input is high, and the capacitor voltage is used to cancel the input offset.

The oscillator (comprising 124-127) starts up when the first control signal 44 goes high, and the output of the comparator 128 is high. The comparator 128 disables the first converter 52 while the input voltage 12 is positive. The first rising edge coming out of the AND gate 124 triggers the first one-shot 127 causing it to produce a pulse. The second one-shot 126 is triggered by the end of that pulse and produces another pulse that goes through the two logic gates 124-125 to trigger the first one-shot again. Thus, the oscillations continue until either the first control signal 44 goes low, or the comparator 128 output goes low because the input voltage polarity changes.

The HKPS provides the bootstrapping. During a "cold start", where the cap voltage 48 is initially zero, the HKPS uses the input voltage 12 to power the control circuits 123-129. But once the cap voltage 48 rises above a predetermined threshold, typically about 10V, the HKPS switches over and uses the cap voltage to power the control circuits. This allows the first converter 52 to keep operating during safe mode when the input voltage 12 is typically just –200 mV, far too low to run the control circuits.

The second converter 53 is much simpler than the first converter 52. The modulator section comprises: a bipolar transistor switch 135; a second inductor 136; and a second diode 137. And the control section comprises: an oscillator 138; a counter 139; a base driver 140; and a charge pump 141. Node 142 is the "ground" for the second converter 53, and the supply rail 143 for the control section is just the negative 12.

The main challenge for the second converter 53 is that it must cold-start when the input voltage 12 exceeds a sixth predetermined threshold, typically 1.2V. As explained in regard to FIG. 9, the input voltage 12 is typically three diode-drops when all the bypass switches 23 are open; but the second blocking diode 55 uses up one of those, leaving just two diode-drops, or about 1.2V, for the second converter to start up with. This voltage is too small to fully enhance a typical MOSFET like 121, so an NPN bipolar transistor 135 is used instead. The NPN needs only about 0.8V from base to emitter to sink enough current through the second inductor 136 to start up.

The start-up sequence for the second converter 53 typically goes as follows. First the oscillator starts up, typically producing a digital clock frequency of about 10 MHz. Second, the oscillator clocks the charge pump (CP) 141, and the CP amplifies the small input 12 voltage to about 10V to turn on the MOSFET that is used as the second blocking diode 55. This greatly reduces the voltage drop across the second blocking diode 55, increasing the supply voltage 143 from two diode-drops to three. Third, once the MOSFET 55 is fully enhanced, the counter 139 is enabled. Typically the counter 139 divides the clock by twenty, producing a fixed switching frequency of about 500 kHz. The duty cycle is also fixed, typically at 95%, although in some embodiments the duty cycle may be smaller at start-up to reduce the peak current in the inductor 136.

A boost converter such as 53 operating in continuous conduction mode with a 95% duty will produce an output voltage about twenty times larger than it's input voltage, if there is no load. So the three diode-drops are multiplied' to about sixty diode-drops, or about 36V. This is significantly higher than the second threshold 83 in FIGS. 8 and 10, where the master control circuit 43 disables the second boost converter 53 by closing all the bypass switches 24.

As noted previously, one key advantage of dividing the power supply 46a into two converters 52 and 53, is that the second converter 53 becomes extremely simple. No housekeeping power supply is needed since the input voltage is 143 fairly well regulated by the bypass diodes 22. A fixed duty cycle can be used, so there is no PWM logic. Also, no CMC is needed because the input voltage has a fairly narrow range. And once again, no voltage feedback is needed because the second converter 53 is also operated in bursts.

Figure 15:
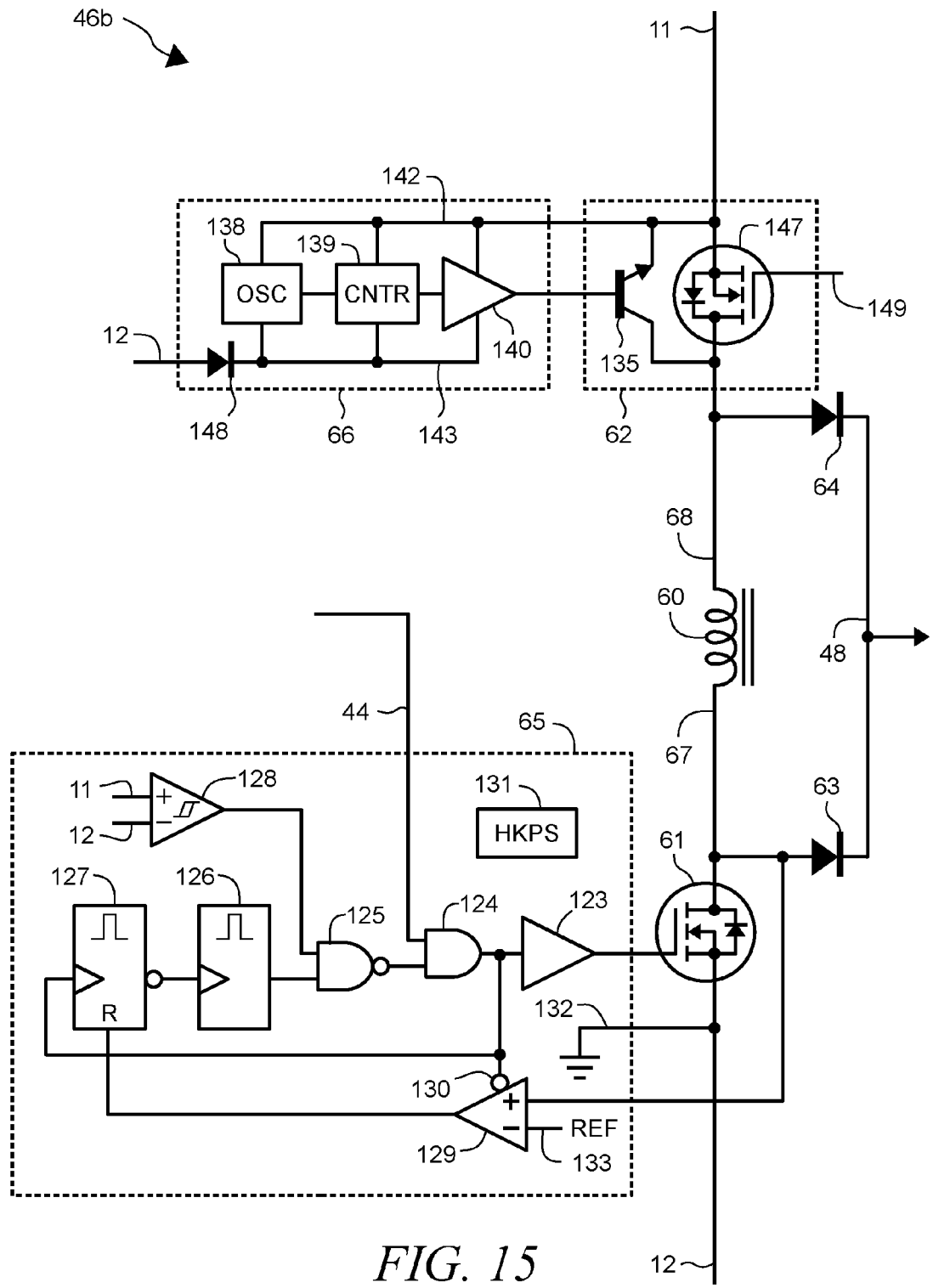
FIG. 15 is a simplified schematic diagram disclosing more details of the second embodiment of the power supply circuit.

FIG. 15 is a simplified schematic of the second embodiment 46b of the power supply, that is even simpler. At least for the purpose of example, the control sections of the first 52 and second 53 converters from 46a can be copied into the first 65 and second 66 control circuits of 46b. Therefore, most of the numerals from FIG. 14 are the same in FIG. 15. The major differences between 46a and 46b are as follows. First, only one inductor 60 is needed instead of two; this alone can represent a significant cost savings. Second, the blocking diodes 54 and 55, and the CP 141 are no longer needed; this significantly reduces the area required to implement the power supply circuit 46b on an integrated circuit, thereby also reducing cost.

The first switch 61 is adapted to allow current flow from the negative terminal 12 to the first end 67 of the inductor 60. This allows the power supply 46b to operate in the second mode, wherein the second control circuit 66 modulates (periodically opens and closes) the second switch 62. Current can flow from the input 12, through the body-diode of the MOSFET 61, through the inductor 60, and then through the second switch 62. But the body-diode of 61 uses up one of the three diode-drops, so the MOSFET 61 is typically turned on continuously while the power supply 46*b* is operating in the second mode. The combination of 123-125, and 128 turns on the MOSFET 61 (but doesn't modulate 61) when: the output of the comparator 128 is low because the input 12 is higher than common 11; therefore the output of the NAND gate 125 is high; and when the first control signal 44 is high, the output of the AND gate 124 is also high; so the gate driver 123 turns on the MOSFET 61.

The first control circuit 65 is arranged to open and close the first switch 61 periodically while the positive terminal 11 is at a relatively higher potential than the negative terminal 12 concurrently with the first control signal 44 being asserted. When the input 12 is negative, the output of the comparator 128 is high. So when the first control signal 44 goes high, the oscillator comprising 124-127 starts up and modulates the first switch 61.

The second switch 62 is adapted to allow current flow from the positive terminal 11 to the second end 68 of the inductor 60. This allows the power supply 46*b* to operate in first mode, wherein the first control circuit 65 modulates the first switch 61. The second switch 62 is a composite of the NPN 135 from FIG. 14 and the new MOSFET 147. Current can flow from positive 11, through the body-diode of the MOSFET 147, through the inductor 60, and then through the first switch 61 when it is closed. In a j-box that does not include safe mode, the MOSFET 147 could be replaced with just a diode. But in a j-box that does have the safe mode feature, a MOSFET 147 is needed to reduce the voltage drop across the second switch 62 during safe mode operation. The gate 149 of the MOSFET 147 is typically driven high in response to the third control signal 51 being asserted. Alternatively, the gate 149 is driven high whenever the oscillator in the first control circuit 65 is running.

The second control circuit 66 is arranged to open and close the second switch 62 periodically while the voltage from the negative terminal 12 to the positive terminal 11 is relatively greater than the sixth predetermined threshold, typically 1.2V. As explained in regard to FIG. 9, the input voltage 12 is typically three diode-drops when all the bypass switches 23 are open; but the third blocking diode 148 in FIG. 15 uses up one of those, leaving just two diode-drops, or about 1.2V, for the second control circuit 66 to start up with. The third blocking diode 148 is needed to protect the second control circuit 66 from reverse bias when the input 12 is negative during normal operation of the solar module.

Figure 16:
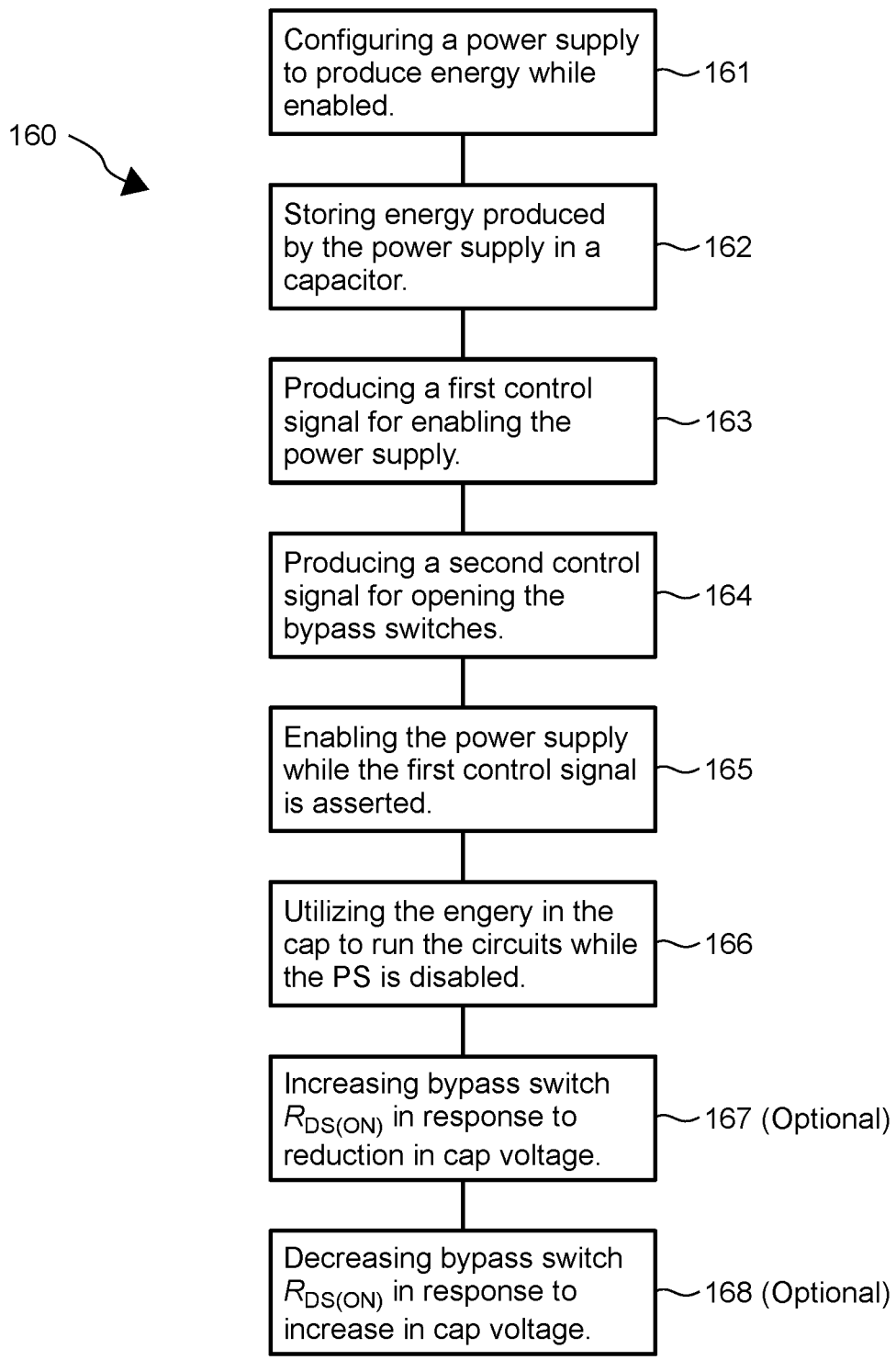
FIG. 16 is a high level diagram of the method of operation for the smart j-box.

FIG. 16 is a high level diagram of the method 160 for providing power to circuitry (at least 43 and 47) inside a smart junction box 41 on a photovoltaic solar power module 40, the solar power module having a plurality of solar cells serially connected between positive 11 and negative 12 output terminals, the smart junction box comprises a plurality of electronically controlled bypass switches 23 arranged to protect the solar cells from reverse bias, and the method comprises six steps, and two additional optional steps.

In the first step 161, the power supply circuit 46 is configured to receive energy from the positive 11 and negative terminals 12 and produce energy in response to being enabled.

In the second step 162, energy produced by the power supply circuit 46 is stored in the capacitor 42.

In the third step 163, the first control signal 44 is produced. As stated previously in regard to FIGS. 8 and 9, the first control signal 44 is asserted in response to the voltage 48 across the capacitor 42 being relatively lower than the first predetermined threshold 82 and unasserted in response to the voltage across the capacitor being relatively greater than the second predetermined threshold 83.

In the fourth step 164, the second control signal 45 is produced for opening the electronically controlled bypass switches. One embodiment of the fourth step 164 comprises substeps of: producing the fourth control signal 93 that is asserted in response to the voltage between the positive and negative terminals being greater than the third predetermined threshold, and unasserted in response to the voltage between the positive and negative terminals being lesser than the fourth predetermined threshold; and asserting the second control signal while both the first and fourth control signals are asserted concurrently. Another embodiment of the fourth step 164 comprises substeps of: asserting the second control signal in response to the voltage across the capacitor being lesser than the fifth predetermined threshold 86 that is relatively lower than the first predetermined threshold 82; and unasserted the second control signal in response to the voltage across the capacitor being relatively greater than the second predetermined threshold 83.

In the fifth step 165, the power supply 46 is enabled while the first control signal 44 is asserted.

In the sixth step 166, energy stored in the capacitor 42 is utilized to power the circuitry (at least 43 and 47) inside the smart j-box 41 while the power supply circuit 46 is disabled.

And, in smart j-boxes 41 that include the means 50 for producing the third control signal 51 representative of the safe mode of operation while asserted, the method 160 comprises the additional steps of: 167 increasing the on-resistance of the electronically controlled bypass switches 23 in response to a reduction of the voltage across the capacitor 42; and 168 decreasing the on-resistance of the electronically controlled bypass switches 23 in response to an increase of the voltage across the capacitor 42.

Although several embodiments have been described in detail for purposes of illustration, various modifications may be made to each without departing from the scope and spirit of the invention. Accordingly, the invention is not to be limited, except as by the appended claims.

What is claimed is:

1. A smart junction box for a photovoltaic solar power module, comprising:
   a positive terminal and a negative terminal for coupling the solar power module to a solar array;
   a capacitor for storing and supplying energy;
   a master control circuit receiving energy from the capacitor for producing at least:
   a first control signal that is asserted in response to the voltage across the capacitor being relatively lower than a first predetermined threshold and unasserted in response to the voltage across the capacitor being relatively higher than a second predetermined threshold, and
   a second control signal;
   a plurality of bypass circuits serially coupled between the positive terminal and the negative terminal; each bypass circuit comprising:
   a bypass diode disposed to protect a group of photovoltaic cells from reverse bias, an electronically controlled switch connected in parallel with the bypass diode, and a control circuit receiving energy from the capacitor for at least:
   opening the electronically controlled switch in response to the second control signal being asserted,
   opening the electronically controlled switch in response to the anode voltage of the bypass diode being relatively lower than the cathode voltage, and closing the electronically controlled switch otherwise; and a power supply circuit arranged to receive power from the positive terminal and the negative terminal for providing energy to recharge the capacitor in response to the first control signal being asserted, the power supply circuit operable with an input voltage that can change polarity during operation.

2. The smart junction box of claim 1, wherein the power supply circuit comprises:
a first dc-to-dc converter for providing power to recharge the capacitor while the positive terminal is at a relatively higher potential than the negative terminal;
a second dc-to-dc converter for providing power to recharge the capacitor while the positive terminal is at a relatively lower potential than the negative terminal;
a first blocking diode disposed to block current flow through the first dc-to-dc converter while the positive terminal is at a relatively lower potential than the negative terminal; and
a second blocking diode disposed to block current flow through the second dc-to-dc converter while the positive terminal is at a relatively higher potential than the negative terminal.

3. The smart junction box of claim 2, including a circuit for producing a third control signal representing a safe mode while asserted.

4. The smart junction box of claim 3, wherein the first blocking diode is the body-diode that is an integral part of a metal-oxide-semiconductor field-effect transistor (MOSFET) that is turned on while the third control signal is asserted.

5. The smart junction box of claim 2, wherein the second blocking diode is the body-diode that is an integral part of a metal-oxide-semiconductor field-effect transistor (MOSFET).

6. The smart junction box of claim 5, wherein the second dc-to-dc converter includes a charge pump for producing a voltage to turn on the metal-oxide-semiconductor field-effect transistor (MOSFET) that is the second blocking diode.

7. The smart junction box of claim 1, wherein the electronically controlled switch in each bypass circuit is a metal-oxide-semiconductor field-effect transistor and the transistor; and the bypass diode is the body-diode that is an integral part of the metal-oxide-semiconductor field-effect transistor and the transistor.

8. The smart junction box of claim 1, wherein the power supply circuit comprises:
an inductor having a first end and a second end;
a first switch disposed between the negative terminal and the first end of the inductor;
a second switch disposed between the positive terminal and the second end of the inductor;
a first diode disposed between the first end of the inductor and the output terminal;
a second diode disposed between the second end of the inductor and the output terminal;
a first control circuit for controlling the first switch; and
a second control circuit for controlling the second switch.

9. The smart junction box of claim 8, wherein:
the first switch is adapted to allow current flow from the negative terminal to the first end of the inductor; and
the first control circuit is arranged to open and close the first switch periodically while the positive terminal is at a relatively higher potential than the negative terminal concurrently with the first control signal being asserted.

10. The smart junction box of claim 8, wherein:
the second switch is adapted to allow current flow from the positive terminal to the second end of the inductor; and
the second control circuit is arranged to open and close the second switch periodically while the voltage from the negative terminal to the positive terminal is relatively greater than a sixth predetermined threshold.

11. The smart junction box of claim 8, including a circuit for producing a third control signal representing a safe mode while asserted.

12. The smart junction box of claim 11, including a circuit for closing the second switch while the third control signal is asserted.

13. The smart junction box of claim 1, wherein:
the master control circuit produces a fourth control signal that is asserted in response to the voltage between the positive and negative terminals being greater than a third predetermined threshold, and unasserted in response to the voltage between the positive and negative terminals being lesser than a fourth predetermined threshold; and
the second control signal is asserted while both the first and fourth control signals are asserted concurrently.

14. The smart junction box of claim 1, wherein the second control signal is asserted in response to the voltage across the capacitor being lesser than a fifth predetermined threshold that is relatively lower than the first predetermined threshold; and unasserted in response to the voltage across the capacitor being relatively greater than the second predetermined threshold.

15. The smart junction box of claim 1, wherein the electronically controlled switches are metal-oxide-semiconductor field-effect transistors, and including a means for:
increasing the on-resistance of the electronically controlled switches in response to a reduction of the voltage across the capacitor; and
decreasing the on-resistance of the electronically controlled switches in response to an increase of the voltage across the capacitor.

16. A method for providing power to circuitry inside a smart junction box on a photovoltaic solar power module, the solar power module having a plurality of solar cells serially connected between positive and negative output terminals, the smart junction box comprises a plurality of electronically controlled bypass switches arranged to protect the solar cells from reverse bias, and the method comprising steps of:
configuring a power supply circuit operable with an input voltage that can change polarity during operation to receive energy from the positive and negative terminals and produce energy in response to being enabled;
storing energy produced by the power supply circuit in a capacitor;
producing a first control signal that is asserted in response to the voltage across the capacitor being relatively lower than a first predetermined threshold and unasserted in response to the voltage across the capacitor being relatively greater than a second predetermined threshold;
producing a second control signal for opening the electronically controlled bypass switches;
enabling the power supply while the first control signal is asserted; and utilizing energy stored in the capacitor to power the circuitry inside the smart junction box while the power supply circuit is disabled.

17. The method of claim 16, and further comprising steps of:
producing a third control signal representative of a safe mode of operation while asserted;
increasing the on-resistance of the electronically controlled bypass switches in response to a reduction of the voltage across the capacitor; and
decreasing the on-resistance of the electronically controlled bypass switches in response to an increase of the voltage across the capacitor.

18. The method of claim 16, wherein the step of producing the second control signal comprises substeps of:
producing a fourth control signal that is asserted in response to the voltage between the positive and negative terminals being greater than a third predetermined threshold, and unasserted in response to the voltage between the positive and negative terminals being lesser than a fourth predetermined threshold; and
asserting the second control signal while both the first and fourth control signals are asserted concurrently.

19. The method of claim 16, wherein the step of producing the second control signal comprises substeps of:
asserting the second control signal in response to the voltage across the capacitor being lesser than a fifth predetermined threshold that is relatively lower than the first predetermined threshold; and
unasserted the second control signal in response to the voltage across the capacitor being relatively greater than the second predetermined threshold.

20. A dc-to-dc converter capable of operating with input voltages of either positive or negative polarity, comprising:
a positive terminal;
a negative terminal;
an output terminal;
an inductor having a first end and a second end;
a first switch disposed between the negative terminal and the first end of the inductor;
a second switch disposed between the positive terminal and the second end of the inductor;
a first diode disposed between the first end of the inductor and the output terminal;
a second diode disposed between the second end of the inductor and the output terminal;
first control circuit for controlling the first switch; and
a second control circuit for controlling the second switch.

21. A smart junction box for a photovoltaic solar power module, comprising:
a positive terminal and a negative terminal for coupling the solar power module to a solar array;
a capacitor for storing and supplying energy;
a master control circuit receiving energy from the capacitor for producing at least:
a first control signal that is asserted in response to the voltage across the capacitor being relatively lower than a first predetermined threshold and unasserted in response to the voltage across the capacitor being relatively higher than a second predetermined threshold, and
a second control signal;
a plurality of bypass circuits serially coupled between the positive terminal and the negative terminal; each bypass circuit comprising:
a bypass diode disposed to protect a group of photovoltaic cells from reverse bias, an electronically controlled switch connected in parallel with the bypass diode, and a control circuit receiving energy from the capacitor for at least:
opening the electronically controlled switch in response to the second control signal being asserted,
opening the electronically controlled switch in response to the anode voltage of the bypass diode being relatively lower than the cathode voltage, and closing the electronically controlled switch otherwise; and
a power supply circuit arranged to receive power from the positive terminal and the negative terminal for providing energy to recharge the capacitor in response to the first control signal being asserted, the power supply circuit comprising:
an inductor having a first end and a second end;
a first switch disposed between the negative terminal and the first end of the inductor;
a second switch disposed between the positive terminal and the second end of the inductor;
a first diode disposed between the first end of the inductor and the output terminal;
a second diode disposed between the second end of the inductor and the output terminal;
a first control circuit for controlling the first switch; and
a second control circuit for controlling the second switch.

22. A smart junction box for a photovoltaic solar power module, comprising:
a positive terminal and a negative terminal for coupling the solar power module to a solar array;
a capacitor for storing and supplying energy;
a master control circuit receiving energy from the capacitor for producing at least:
a first control signal that is asserted in response to the voltage across the capacitor being relatively lower than a first predetermined threshold and unasserted in response to the voltage across the capacitor being relatively higher than a second predetermined threshold, and
a second control signal;
a plurality of bypass circuits serially coupled between the positive terminal and the negative terminal; each bypass circuit comprising:
a bypass diode disposed to protect a group of photovoltaic cells from reverse bias, an electronically controlled switch connected in parallel with the bypass diode, and a control circuit receiving energy from the capacitor for at least:
opening the electronically controlled switch in response to the second control signal being asserted,
opening the electronically controlled switch in response to the anode voltage of the bypass diode being relatively lower than the cathode voltage, and closing the electronically controlled switch otherwise; and
a power supply circuit arranged to receive power from the positive terminal and the negative terminal for providing energy to recharge the capacitor in response to the first control signal being asserted;
wherein the master control circuit produces a fourth control signal that is asserted in response to the voltage between the positive and negative terminals being greater than a third predetermined threshold, and unasserted in response to the voltage between the positive and negative terminals being lesser than a fourth predetermined threshold; and the second control signal is asserted while both the first and fourth control signals are asserted concurrently.

23. A smart junction box for a photovoltaic solar power module, comprising:
- a positive terminal and a negative terminal for coupling the solar power module to a solar array;
- a capacitor for storing and supplying energy;
- a master control circuit receiving energy from the capacitor for producing at least:
  - a first control signal that is asserted in response to the voltage across the capacitor being relatively lower than a first predetermined threshold and unasserted in response to the voltage across the capacitor being relatively higher than a second predetermined threshold, and
  - a second control signal;
- a plurality of bypass circuits serially coupled between the positive terminal and the negative terminal; each bypass circuit comprising:
- a bypass diode disposed to protect a group of photovoltaic cells from reverse bias, an electronically controlled switch connected in parallel with the bypass diode, and a control circuit receiving energy from the capacitor for at least:
  - opening the electronically controlled switch in response to the second control signal being asserted,
  - opening the electronically controlled switch in response to the anode voltage of the bypass diode being relatively lower than the cathode voltage, and
  - closing the electronically controlled switch otherwise; and
- a power supply circuit arranged to receive power from the positive terminal and the negative terminal for providing energy to recharge the capacitor in response to the first control signal being asserted;
- wherein the second control signal is asserted in response to the voltage across the capacitor being lesser than a fifth predetermined threshold that is relatively lower than the first predetermined threshold; and unasserted in response to the voltage across the capacitor being relatively greater than the second predetermined threshold.

24. A method for providing power to circuitry inside a smart junction box on a photovoltaic solar power module, the solar power module having a plurality of solar cells serially connected between positive and negative output terminals, the smart junction box comprises a plurality of electronically controlled bypass switches arranged to protect the solar cells from reverse bias, and the method comprising steps of:
- configuring a power supply circuit to receive energy from the positive and negative terminals and produce energy in response to being enabled;
- storing energy produced by the power supply circuit in a capacitor;
- producing a first control signal that is asserted in response to the voltage across the capacitor being relatively lower than a first predetermined threshold and unasserted in response to the voltage across the capacitor being relatively greater than a second predetermined threshold;
- producing a second control signal for opening the electronically controlled bypass switches, including:
  - producing a fourth control signal that is asserted in response to the voltage between the positive and negative terminals being greater than a third predetermined threshold, and unasserted in response to the voltage between the positive and negative terminals being lesser than a fourth predetermined threshold; and
  - asserting the second control signal while both the first and fourth control signals are asserted concurrently;
- enabling the power supply while the first control signal is asserted; and
- utilizing energy stored in the capacitor to power the circuitry inside the smart junction box while the power supply circuit is disabled.

25. A method for providing power to circuitry inside a smart junction box on a photovoltaic solar power module, the solar power module having a plurality of solar cells serially connected between positive and negative output terminals, the smart junction box comprises a plurality of electronically controlled bypass switches arranged to protect the solar cells from reverse bias, and the method comprising steps of:
- configuring a power supply circuit to receive energy from the positive and negative terminals and produce energy in response to being enabled;
- storing energy produced by the power supply circuit in a capacitor;
- producing a first control signal that is asserted in response to the voltage across the capacitor being relatively lower than a first predetermined threshold and unasserted in response to the voltage across the capacitor being relatively greater than a second predetermined threshold;
- producing a second control signal for opening the electronically controlled bypass switches, including
  - asserting the second control signal in response to the voltage across the capacitor being lesser than a fifth predetermined threshold that is relatively lower than the first predetermined threshold; and
  - unasserted the second control signal in response to the voltage across the capacitor being relatively greater than the second predetermined threshold;
- enabling the power supply while the first control signal is asserted; and
- utilizing energy stored in the capacitor to power the circuitry inside the smart junction box while the power supply circuit is disabled.

* * * * *